April 12, 1966    J. H. CYPHER ET AL    3,245,772
METHOD OF HEAT TREATING GLASS SHEETS WHILE BEING CONVEYED
Filed May 24 1965    2 Sheets-Sheet 1

INVENTORS
JAMES H. CYPHER
CHARLES R. DAVIDSON JR
BY
Oscar L. Spencer
ATTORNEY

April 12, 1966  J. H. CYPHER ET AL  3,245,772
METHOD OF HEAT TREATING GLASS SHEETS WHILE BEING CONVEYED
Filed May 24 1965
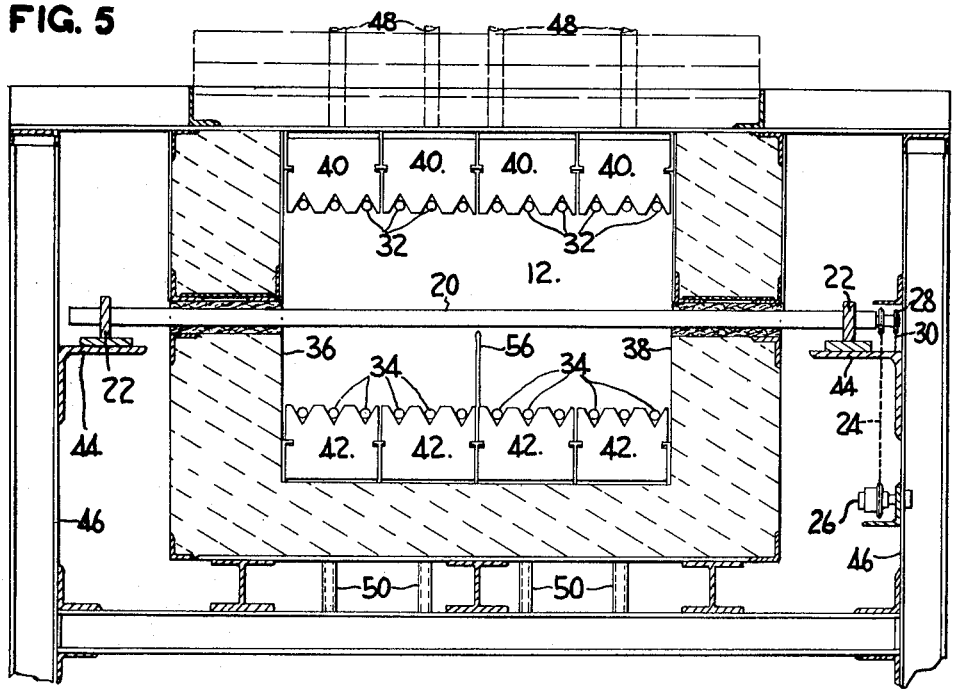
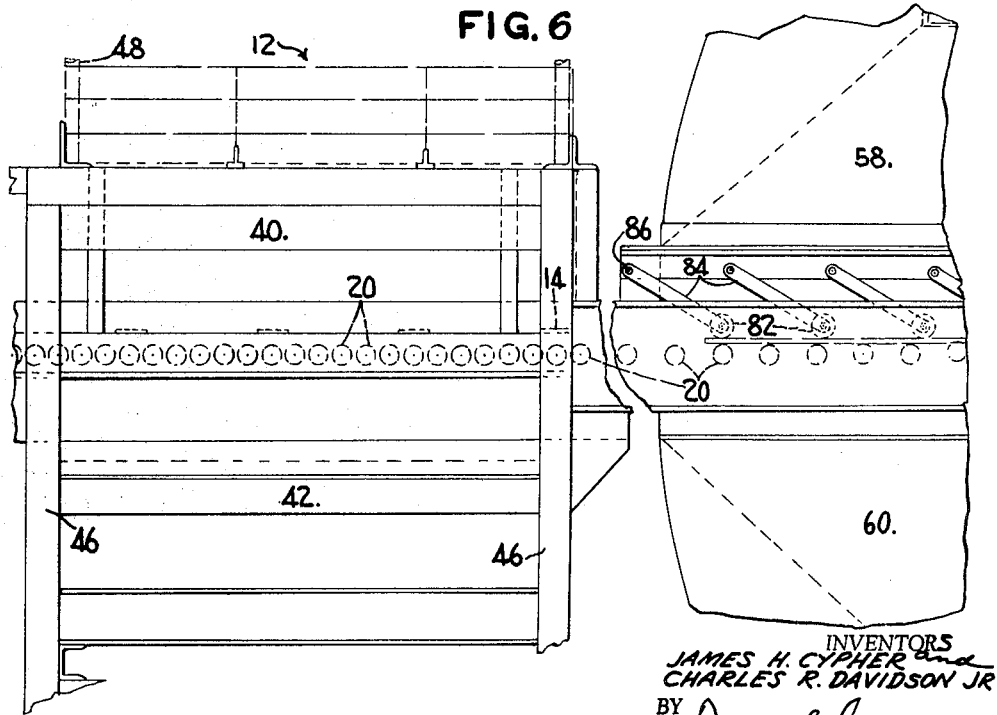

United States Patent Office 3,245,772
Patented Apr. 12, 1966

3,245,772
METHOD OF HEAT TREATING GLASS SHEETS
WHILE BEING CONVEYED
James H. Cypher, New Kensington, and Charles R. Davidson, Jr., Tarentum, Pa., assignors to Pittsburgh Plate Glass Company, Pittsburgh, Pa., a corporation of Pennsylvania
Filed May 24, 1965, Ser. No. 463,455
4 Claims. (Cl. 65—111)

This application is a continuation-in-part of copending application Serial No. 326,125, filed November 26, 1963, now abandoned, which application is a continuation-in-part of copending application Serial No. 142,570, filed October 3, 1961, now abandoned. All the aforesaid applications are assigned to the assignee of the present application.

This invention relates to the art of treating glass sheets and more particularly relates to transportation and/or support of hot glass sheets, especially in connection with other operations, such as tempering, annealing, or coating such sheets. In mass-production operations, the present invention is performed while conveying a series of sheets of glass in succession along a path of travel. During this travel, the sheets are heated and/or cooled in a novel manner.

The present invention comprises differentially thermally treating the major surfaces of the sheets. In tempering operations, for example, the thermal treatment may comprise heating the surfaces of each sheet in succession until the sheet is at a temperature sufficient for tempering or at least partial tempering and then quenching the sheet.

Sheets of glass may be fabricated through known manufacturing techniques of tempering, annealing or coating and combinations of such techniques to form end products having characteristics and uses different from the original product. A common feature of these techniques is the heating of glass sheets to a temperature above that at which the major surfaces or the contour thereof is changed by a deforming stress on contact with solids, hereinafter referred to as deformation temperature. For most plate and window glass compositions this temperature range is around 980 degrees Fahrenheit and above, but below a temperature at which the glass becomes molten.

Economic utilization of fabricating equipment requires that the glass sheets undergoing treatment be conveyed while hot. The necessity of conveying glass at high temperature has heretofore resulted in undesirable deformation or marring of the major surfaces of the glass sheets being treated due to physical contact with supporting and conveying apparatus while the glass is at elevated temperatures.

The instant invention overcomes this defect common to the known methods of heat-treating glass sheets by differentially heating the top and bottom surfaces of the sheet to bow the glass into a convex elevational configuration transversely of the path of movement while conveying the bowed glass sheet along said conveying elements and while it is supported along side edges thereof by said conveyor elements and while the central area of the glass is out of engagement with said elements. In a specific embodiment of the present invention, this is accomplished by applying heat onto the upper surface of the moving glass sheets to an extent sufficiently greater than that at which the bottom surface is heated before the temperature of the glass sheets reaches the range at which deformation takes place on contacting a solid member. This non-uniform heating early in the heating cycle causes the glass sheets to bow into a convex elevational configuration transversely of their path of movement and permits the glass sheets to be supported along the marginal side edges of their bottom surfaces only during the time that the glass sheets are at the elevated temperature range at which they are susceptible to deformation.

According to a specific illustrative embodiment of the present invention wherein glass sheets are prepared for tempering, the glass sheets are heat-treated while conveyed in a substantially horizontal direction along conveyor elements spaced longitudinally of and extending transversely of the direction of conveyance. This heat treatment involves heating the glass sheets to an elevated temperature range at which they are susceptible to deformation and the bottom surface of the sheets is susceptible to becoming marked by having both glass surfaces directly face heating means as the sheets are conveyed on the spaced conveyor elements.

During the early stages of the heating cycle, the glass sheets are bowed into a convex elevational configuration by imparting heat into their upper surfaces to an extent sufficiently greater than that at which their bottom surfaces are heated. Gradually the heat balance on opposite sides of the sheet is adjusted by altering the heating conditions on opposite sides thereof to decrease the bow therein. Specifically, the bottom surfaces are heated at an increased rate to tend to equalize the temperature of the top and bottom surfaces of the moving glass sheets while maintaining their bowed configuration.

The necessity of conveying glass at high temperature has heretofore resulted in undesirable deformation or marring of the major surfaces of glass sheets being treated due to physical contact with supporting and conveying apparatus while the glass is at elevated temperatures. Where glass is conveyed upon metal rolls and heated by radiant heaters, the transparency of the glass to a large portion of the radiant heat results in the overheating of the metal rolls. When the glass sheets come in contact with the heated rolls, localized surface melting often occurs. In addition, scale from the metal rolls is often imbedded into the softened surface of the glass sheets. These defects are known as "roll burn" and impair the quality of the finished products. The instant invention overcomes these defects common to the known methods of heat treating glass sheets.

It has been stated that roll burn, which sometimes occurs in the preheat section in the manner previously described, may be eliminated by bowing the glass sheets convexly upward during the preheat so that only edge contact is maintained between the glass sheets and the conveying rolls. This bowing is accomplished by applying heat at a greater rate to the top surface of the glass sheet than to the bottom surface.

More particularly, an embodiment of the present invention contemplates a system wherein the glass sheets are heated on a roller conveyor in a preheat section to a temperature approximating the deformation temperature of the glass under imbalanced conditions imposed by maintaining a radiant heat source above the glass sheets at a higher temperature than a radiant heat source below the glass sheets. In this manner, a non-symmetrical thermal gradient will be produced through the thickness of the glass, thereby creating a nonsymmetrical stress distribution causing temporary strain which bows the glass sheets convexly upward. While this imbalance in heat input is maintained, the glass sheets are conveyed by edge contact only upon the rolling supports of the preheat section.

A particular apparatus illustrating the present invention will now be described as well as its method of operation in order to provide a complete disclosure in accordance with the requirements of the Patent Office.

It is also understood that while the present invention has particular utility when employed with the conveyor illustrated, in its broader aspects, the principle of differential thermal treatment taught by the present invention is susceptible of use while conveying glass during its successive exposure to different temperatures during its fabrication from one product to another.

In the drawings forming part of the description of the illustrative embodiment wherein like reference numerals refer to like structural elements, FIG. 1 is a plan view of a conveyor for tempering glass sheets employing the principles of the present invention;

FIG. 5 is a cross-sectional view of the furnace showing the arrangement of heating elements and the conveyor rolls taken along the lines V—V of FIG. 2;

FIG. 6 is a fragmentary longitudinal elevational view of a portion of the furnace and a portion of the quenching apparatus taken along the lines VI—VI of FIG. 1 and showing certain details thereof.

Figure 1:
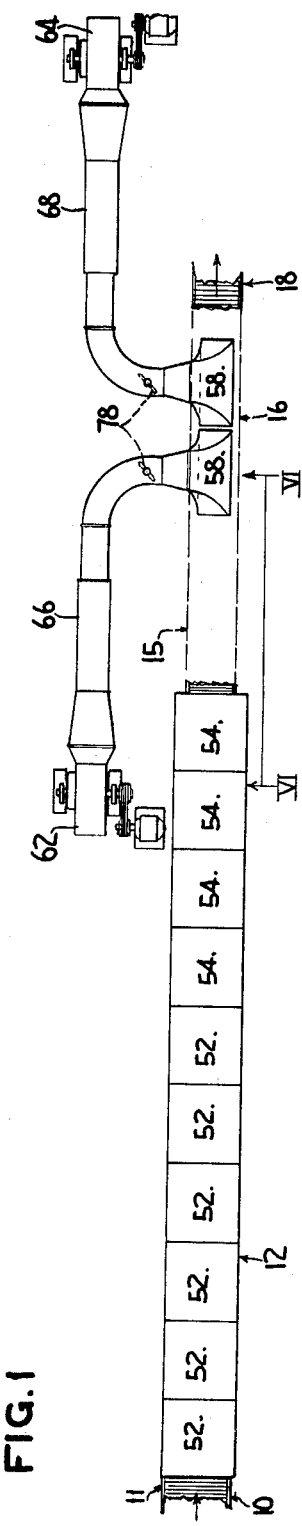
Figure 2:
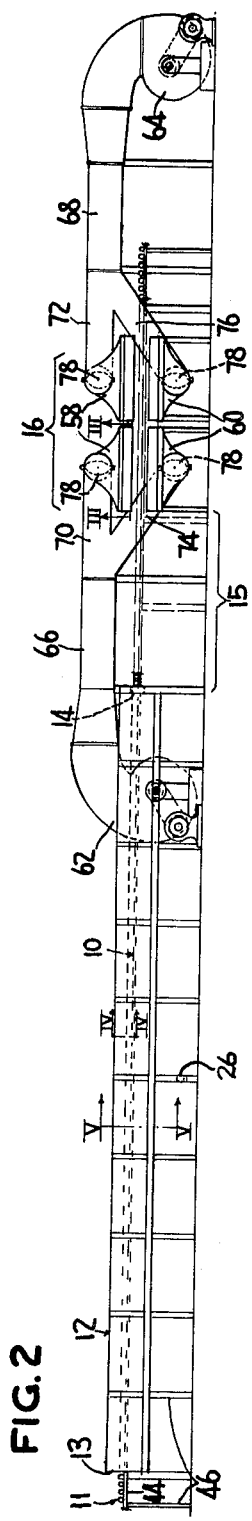
FIG. 2 is a longitudinal elevation of the apparatus depicted in FIG. 1.

The apparatus comprises a horizontal conveyor 10 extending from a loading station 11 through a tunnel-like furnace 12 having a horizontal slot entrance 13 and a horizontal slot exit 14, a transfer section 15, a quenching section 16, and a glass unloading station 18. The conveyor comprises a series of one inch diameter solid rolls 20 made of 316 stainless steel.

Each roll extends through a pair of transversely spaced bearing housings 22 and is driven by means of one or more chain drives 24 driven by a motor 26. Sprockets 28 at one end of the drive shafts for each conveyor roll 20 are interconnected through a connecting chain 30.

The tunnel-like lehr 12 is provided with upper heating elements 32 and lower heating elements 34 extending longitudinally of the furnace. The upper heating elements 32 are attached to the roof thereof and the lower heating elements 34 are attached to the floor thereof. The conveyor rolls 20 extend through apertures in the respective side walls 36 and 38 of furnace 12 aligned with bearing housings 22 to form a series of conveyor elements extending transversely of the path of movement and spaced longitudinally thereof along the length of the furnace.

Each of the heating elements 32 and 34 comprises an electrical resistance, preferably of nichrome wire mounted in a refractory element 40 or 42. The refractory elements 40 support the upper heating elements 32 and the refractory elements 42 support the lower heating elements 34.

Each of the refractory support elements 40 and 42 extend longitudinally of the furnace 12 and each is provided with a series of three grooves extending longitudinally of the furnace. Each electrical resistance wire is connected to an individual control circuit.

Each of the refractory elements 40 is located in side-by-side relationship above the portion of conveyor 10 within the furnace 12. Refractory elements 42 are disposed below the conveyor rolls 20 in mirror relation opposing refractory elements 40. The upper heating elements 32 face the upper surface of the glass sheets moving through the furnace while the lower heating elements 34 face the bottom surfaces of said glass sheets.

Each bearing housing 22 is supported on a horizontally extending angle iron 44 extending longitudinally and immediately outside the sidewalls of the furnace 12. Each angle iron 44, in turn, is rigidly attached to one of a series of vertical pillars 46 which forms part of a metal structure reinforcing and surrounding the tunnel-like furnace 12.

Each of the upper heating elements 32 is connected to a voltage regulator circuit (not shown) by means of lead wires extending through conduits 48. Similarly the lower heating elements 34 are connected to additional voltage regulator circuits (also not shown) through lead wires extending through conduits 50. The relative amount of voltage applied to opposing sets of heating elements 32 and 34 forms an important part of the present invention, but the specific details of the voltage control circuits do not.

Many well-known voltage control circuits available commercially are suitable for this purpose. The control circuit for controlling the voltage supplied to each heating element 32 or 34 may be of the type described in U.S. Patent No. 2,774,190 to Florian V. Atkeson, the description of which is incorporated by reference in the present application.

The furnace 12 is divided into several preheat sections 52 followed by a few intense heating sections 54. Each of the furnace sections 52 and 54 is provided with a heat-sensing device 56 located centrally of the furnace section to provide a continuous reading of the ambient air between the rolls in the center of each furnace section.

After the glass has been heated to the desired temperature while transported through the furnace 12, it is conveyed along the transfer conveyor section 15 at a relatively high speed from the furnace 12 into the quenching station 16. There, the surfaces of the heated glass sheet are suddenly chilled to impose a temper in the sheet.

The tempering station 16 of the illustrative embodiment comprises a pair of upper plenum chambers 58 and lower plenum chambers 60. Air under pressure is furnished to the plenum chambers 58 and 60 through blowers 62 and 64 and conduits 66 and 68. Branch conduits 70 and 72 supply air to the upper plenum chambers 58 from conduits 66 and 68. Branch conduits 74 and 76 supply air to the lower plenum chambers 60 from conduits 66 and 68. A valve 78 is located in each of the branch conduits 70, 72, 74, and 76 in order to control the rate of flow of air from the blowers 62 and 64 into the upper and lower plenum chambers 58 and 60.

Figure 3:
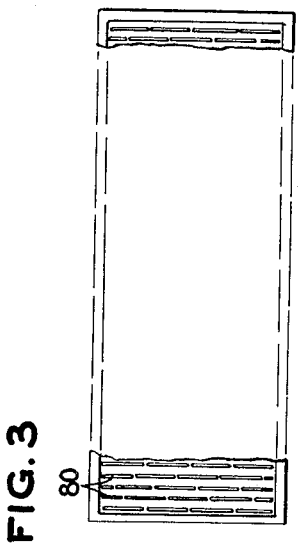
FIG. 3 is a plan view of nozzle orifices in the quenching station taken along the lines III—III of FIG. 2.

FIG. 3 discloses the arrangement of the slot-type nozzles through which air under pressure is imparted to the upper and lower surfaces of the glass sheet. The upper and lower plenum chambers have a series of parallel slot nozzles 80, each extending transversely of the longitudinal axis of the conveyor 10 for a portion of its width.

Additional conveyor rolls 20 are provided beyond the quenching station 16. Glass sheets conveyed past the quenching station 16 are thus accessible in this extension of the conveyor for unloading. Hence, this conveyor section is termed the unloading section 18.

The conveyor rolls 20 are mounted on 3 inch centers in all parts of the conveyor 10 except in the intensely heated sections 54 of the furnace where their separation is 1.5 inches.

In a typical operation, the ambient temperature determined by the sensing element in the center of the various zones was set as follows. In the preheat zones 52 the temperatures were set at 1120 degrees Fahrenheit. The temperatures in the relatively hot zones 54 were set at 1200 degrees Fahrenheit and 1300 degrees Fahrenheit, respectively. Thus, an ambient temperature gradient of from 1120 degrees Fahrenheit to 1300 degrees Fahrenheit was established over the length of the furnace.

Rheostat settings controlling the input of current into the upper heating elements 32 and lower heating elements 34 were preset to read "100 percent" for Ohmite rheostat settings controlling the current through the upper heating elements while the rheostat settings for the bottom heating elements were only "20 percent" in the preheat zones 52 and "30 percent" in the intense heating sections 54.

Glass sheets for automobile sidelights having a substantially rectangular shape with dimensions of about 15 inches by about 21 inches and a nominal thickness of $7/32$ inch and composed of sheet glass having a chemical composition of $SiO_2$ 72.6 percent by weight, $Na_2O$ 13.1 percent by weight, $CaO$ 8.6 percent by weight, $MgO$ 3.6 percent by weight, $Na_2SO_4$ 0.6 percent by weight, $NaCl$ 0.1 percent by weight, $Fe_2O_3$ 0.1 percent by weight, $Al_2O_3$ 1.3 percent by weight, were run through the furnace with the long dimension parallel to the axis of movement.

Figure 4:
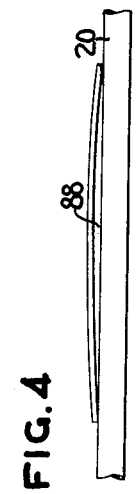
FIG. 4 is a sectional view taken along the lines IV—IV of FIG. 2 showing how the glass sheet is warped as it is conveyed through the heating furnace.

Of 182 plates tried in one run, 94 percent were successfully tempered into sidelights without breakage. During their passage through the furnace, this differential heat treatment described above caused the glass sheets to bow upward as shown in FIG. 4 by reference number 88. The impact pressure on the glass sheets passing through the quenching station was adjusted to 2.3 ounces per square inch through the slot nozzles 80 of the lower plenum chambers 60 and 2.0 ounces per square inch through the slot nozzles of the upper plenum chambers 58.

The glass sheets were inspected after the run described above and merely showed light burns along their edges. The major glass surfaces were completely free from scuff marks.

The tempered glass was inspected for flatness by inspecting light reflection of a zebra board at the glass surfaces. This inspection revealed much less roll ripple compared to earlier samples produced by a technique not involving applying different heat intensities to the upper and lower glass surfaces.

A sampling of glass sheets was subjected to fracture to determine the size of the particles of the tempered glass sheet. As is well known in the tempering art, the smaller the particles the better is the temper. In the case recited above, the particles of the fractured tempered glass were within the limits established as acceptable. Furthermore, the sheets were substantially free from warpage or tong marks and within the limits for flatness desired by the customer.

Distortion in sidelights produced by this process has been measured by a device developed by the Pittsburgh Plate Glass Company and known as a distortion analyzer. This device transmits a collimated beam of light through the tested glass sheet onto a triangular shaped area on the opposite side of the glass sheet and immediately in front of the light-sensitive element of a photomultiplier.

The distortion analyzer provides three arbitrary numbers for each sample tested based on the voltage variations in the photomultiplier output circuit as the glass sheet is scanned in a direction normal to the collimated beam.

These numbers represent a reading for the sum of distortion in the tested sample determined by averaging the total photomultiplier output across the sheet for three scannings of the tested sample, a maximum voltage reading for the peak distortion and a voltage reading for the maximum distortion in the worst three inches of scanning. The higher the arbitrary number reported, the greater is the output current of the phototube, and the greater is the distortion. Perfectly flat glass with parallel surfaces would have a value of zero when tested on the distortion analyzer.

By way of comparison, the sum of distortion value for plate glass ranges from 2 to 15 with values ranging from 2 to 8 for plate glass ground simultaneously on both surfaces and ranging from 5 to 15 for plate glass ground on one surface at a time. However, these values probably result from surface imperfections due to grinding and the distortion analyzer is designed to measure distortion transverse to the direction of draw in a ribbon of drawn sheet glass.

In order to compare the distortion produced by tempering glass sheets while supported on a horizontal conveyor of the type described above with a typical tempering operation in which glass sheets are suspended vertically from tongs for a tempering operation, ten plates of drawn sheet glass were measured for distortion on the Pittsburgh Plate Glass distortion analyzer both before and after tempering. Five of the plates were tempered using tongs to grip them during the tempering operation while the other five plates were tempered using the roller support apparatus and the principles of the invention described above. Table I below compares the results.

TABLE I

| | Sample No. | Tong supported | | Sample No. | Roller supported | |
|---|---|---|---|---|---|---|
| | | Before | After | | Before | After |
| Sum of distortion | T1 | 22 | 26 | R1 | 17 | 17 |
| | T2 | 19 | 20 | R2 | 5 | 5 |
| | T3 | 4 | 8 | R3 | 19 | 18 |
| | T4 | 16 | 16 | R4 | 27 | 27 |
| | T5 | 4.5 | 5 | R5 | 5 | 5 |
| Peak distortion | T1 | 14 | 16 | R1 | 11 | 16 |
| | T2 | 14 | 12 | R2 | 5 | 3 |
| | T3 | 2 | 10 | R3 | 12 | 15 |
| | T4 | 10 | 10 | R4 | 16 | 16 |
| | T5 | 7.5 | 6 | R5 | 8 | 5 |
| Peak distortion for worst 3 inch. | T1 | 9 | 10 | R1 | 6 | 6 |
| | T2 | 8 | 7 | R2 | 2 | 2 |
| | T3 | 2 | 4 | R3 | 7 | 7 |
| | T4 | 6 | 5 | R4 | 10 | 10 |
| | T5 | 2.5 | 1.5 | R5 | 2 | 2 |
| Totals | | 140.5 | 156.5 | | 152 | 154 |
| Percent increase in total distortion after tempering | | | 11.4 | | | 1.3 |

Samples T1 to T5 were tong supported. Samples R1 to R5 were supported on a horizontal roller conveyor.

The results of these experiments indicated that the proper employment of a horizontal conveyor for tempering glass sheets produces less distortion than the prior art tempering involving supporting the glass sheets vertically from tongs.

It has been possible to mass-produce random patterns of tempered automobile side lights which are substantially rectangular in outline and tempered vent panes which are substantially triangular or trapezoidal in shape provided the thickness range of the various patterns of the product mix is within $\frac{1}{32}$ inch. Thus, it is possible to temper glass plates of say $\frac{3}{16}$ inch thickness with glass plates of $\frac{7}{32}$ inch thickness or $\frac{1}{4}$ inch thick glass plates with glass plates of $\frac{7}{32}$ inch thickness using the techniques described above.

Experiments have determined that between 4 and 5 minutes is the optimum duration for the heating cycle in order to minimize burn and scuff marks. The glass plates should be moved through the furnace at a minimum speed of between 7.5 and 8 feet per minute on 1 inch diameter rolls spaced 3 inches apart from center to center in order to achieve sufficient freedom from deformation to produce an acceptable product from this standpoint. Hence, a minimum length of furnace to produce acceptable glass is 38 feet. A longer furnace employing faster conveyor speeds produces superior products at the expense of increasing thermal input. A reasonable range of length of furnace for efficient operation is 50 feet to 60 feet.

The present invention provides a technique wherein a relatively small amount of heat is imparted to the bottom surface of the glass sheet compared to that imparted to its top surface early in the heating cycle. This causes the transverse dimension of the sheet to bow upwardly so that only the side edges of its bottom surface contact the solid rolls of the horizontal conveyor. This limits scuff marks and roll deformation to the part of each fabricated glass sheet that is eventually encased in a framing member.

As each glass sheet moves through the furnace its temperature increases because its upper and lower surfaces are exposed to the radiant energy radiated by the upper and lower heating elements. The temperature increases throughout the thickness of the glass sheet by heat conduction inwardly of the glass surface into the body of the glass.

As the proportion of heat imparted by the bottom heating elements compared to that imparted by the upper heating elements increases toward the exit of the furnace, the rate of heat absorption by the bottom glass surface of the glass sheet, which initially was very small compared to that of its top surface, increases significantly toward the end of the heating cycle while the rate of temperature increase at the upper surface of the glass sheet is diminishing. This combination of effects reduces but does not completely eliminate the upward bowing of the glass sheet. Therefore, the glass sheet is still resting substantially entirely on its side edges as it leaves the furnace and enters the quenching station.

All the parts presently fabricated on a horizontal roll conveyor have one common denominator. They are all initially heated in such a manner that the glass plates are initially caused to bow upwardly into a convex configuration transversely of the path of movement.

The present invention has provided a means of producing tempered glass sheets in the thermal treatment involving conveying the sheets on spaced solid conveyor elements without causing the deterioration of optical properties that accompanied the earlier thermal treatments.

The process treatment of the present invention has been described in an environment in which the sheets are conveyed in direct sequential contact with successive solid conveyor elements spaced longitudinally of and extending transversely of the path of glass movement. In such an environment, the essential element of the novel differential thermal treatment involves differentially heating the major surfaces of the conveyed sheets to induce a convex bow therein so as to limit the contact with the solid conveyor elements when the glass sheets are at elevated temperatures where they are most susceptible of being marred and deformed.

Operation

The following is an example, by way of illustration only, of a preferred mode of operation of the invention disclosed herein as applied to the treatment of glass sheets:

Sheets of glass one-quarter inch nominal thickness and approximately 16 inches wide by 27 inches long are placed lengthwise seriatim and conveyed on rolls at a line speed of 1.3 inches per second. In this manner, an average of about 90 pieces of glass per hour are conveyed through the system. Electric heating coils 32 and 34 above and below the moving glass supply heat to the preheat section for approximately 15 feet of the glass travel. Throughout this section, the heating coils above the glass are maintained at a temperature of approximately 1600 degrees Fahrenheit and the coils below the glass are maintained at a temperature of approximately 1150 to 1250 degrees Fahrenheit. The temperature of the upper coils is adjusted transversely of the glass travel to apply more heat to the central portion of the glass sheet than to the side edges but is supplied substantially uniformly along the direction of glass travel. In this manner, the glass is rapidly bowed convexly upward in a cylindrical curve, the axis of which is in the direction of glass travel. The central portion of each sheet becomes spaced from the rolls approximately $1/16$ inch while contact with the rolls is maintained along the edges of the sheet longitudinally of the path of travel. The temperature of the glass reaches approximately 950 degrees Fahrenheit at the end of the preheat section.

While the present description has been made to illustrate the present invention and has illustrated its use in a tempering operation, it is understood that the principles of the present invention may readily be employed for coating and annealing and other techniques involving thermal treatments of glass sheets involving conveying the glass sheets during their thermal treatment.

What is claimed is:

1. In the art of heat treating a substantially horizontally disposed glass sheet while being conveyed in a substantially horizontal direction in direct sequential contact with successive conveyor elements spaced longitudinally of and extending transversely of the path of glass movement, the improvement which comprises differentially heating the top and bottom surfaces of the sheet to bow the glass into a convex elevational configuration transversely of the path of movement while conveying the bowed glass sheet along said conveying elements and while it is supported along side edges thereof by said conveyor elements and while the central area of the glass is out of engagement with said elements.

2. The improvement according to claim 1, including further heating the glass while it is so supported to an elevated temperature at which the glass is susceptible of being marred.

3. The improvement according to claim 1, including further heating the glass while it is so supported to an elevated temperature at which the glass is susceptible of being marred and thereafter adjusting the heat balance on opposite sides of the sheet by altering the heating conditions on opposite sides thereof to decrease the bow therein.

4. The improvement according to claim 3, wherein the proportion of heat applied to the bottom surface of the glass sheet compared to that applied to the top surface of the glass sheet is increased before the glass sheet is heated to said elevated temperature.

References Cited by the Examiner
UNITED STATES PATENTS

| | | | |
|---|---|---|---|
| 1,593,632 | 7/1926 | Hartzell | 65—119 |
| 2,376,872 | 5/1945 | Harris | 65—115 |
| 2,703,949 | 3/1955 | Gaiser | 65—60 |
| 2,985,986 | 5/1961 | Leflet | 65—62 |

DONALL H. SYLVESTER, *Primary Examiner.*

A. D. KELLOGG, *Assistant Examiner.*